2 Sheets—Sheet 1.

J. L. SHEPPARD.

Bale-Tie.

No. 8,679 Reissued April 15, 1879.

WITNESSES
E. S. Nottingham
A. M. Bright

INVENTOR
John L. Sheppard.
By H. A. Seymour.
ATTORNEY

N. PETERS, PHOTO-LITHOGRAPHER, WASHINGTON, D. C.

J. L. SHEPPARD.

Bale-Tie.

No. 8,679. Reissued April 15, 1879.

WITNESSES
E. F. Nottingham
A. M. Bright

John L. Sheppard. INVENTOR
By H. A. Seymour. ATTORNEY

N. PETERS, PHOTO-LITHOGRAPHER, WASHINGTON, D. C.

UNITED STATES PATENT OFFICE.

JOHN L. SHEPPARD, OF CHARLESTON, SOUTH CAROLINA.

IMPROVEMENT IN BALE-TIES.

Specification forming part of Letters Patent No. 69,849, dated October 15, 1867; Reissue No. 8,679, dated April 15, 1879; application filed March 11, 1879.

*To all whom it may concern:*

Be it known that I, JOHN L. SHEPPARD, of Charleston, in the county of Charleston and State of South Carolina, have invented certain new and useful Improvements in Bale-Ties; and I do hereby declare the following to be a full, clear, and exact description of the invention, such as will enable others skilled in the art to which it pertains to make and use it, reference being had to the accompanying drawings, which form part of this specification.

My invention relates to an improvement in bale-ties, the object being to provide a buckle of such construction that the free end of the band may be passed through a band-opening in the buckle when the latter is turned back upon the band end to which it is secured, and the buckle, when upset or turned in the opposite direction, will automatically form a return-bend in the free end of the band, and thus firmly secure the opposite ends of the band, and form a perfect and reliable tie; and to this end my invention consists, first, in a buckle provided at one end with a cross-bar for the attachment of one end of the band, the opposite portion of the buckle being provided with a band-opening, through which the free end of the band may be inserted when the buckle is turned back upon the band end to which it is attached.

My invention further consists in a buckle adapted to have one end of a bale-band attached to one end thereof, said buckle being provided with a band-opening, through which the free end of the band may be inserted when the buckle is turned back and rests upon the band end to which the buckle is first secured, and also constructed to retain the outer end of the band depressed and preserve the tie or lock when the buckle is upset and a return-bend formed in the free end of the band.

My invention further consists in certain details of construction and arrangement of parts, as will be hereinafter explained, and pointed out in the claims.

Figure 1:
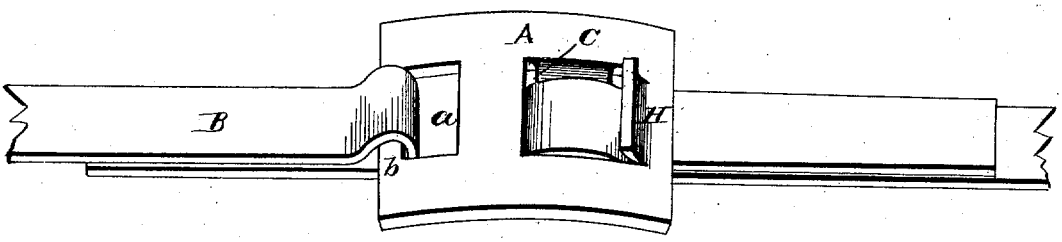
Figure 2:
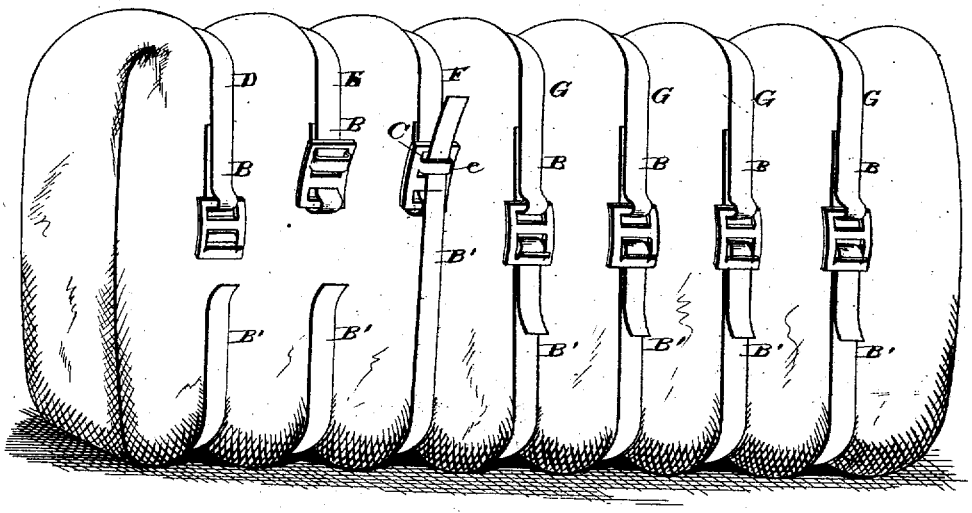
Figure 3:
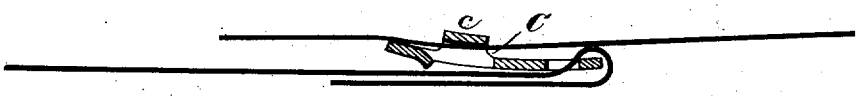
Figure 4:
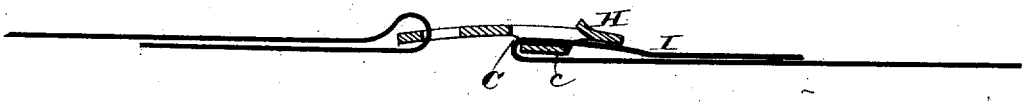

In the accompanying drawings, Figure 1 is an enlarged view, in perspective, of my improved buckle, with the opposite ends of a band secured thereto; and Fig. 2 is a view, in perspective, of a cotton-bale, showing my improved buckle in its different positions when applied to bands surrounding the bale. Fig. 3 is a longitudinal section with buckle in position for inserting the free end of the band; and Fig. 4 is a similar view, showing the buckle locked.

A represents my improved buckle, one end of which is provided with a slot or band-opening, *a*, through which one end, B, of the band is inserted and bent around the cross-bar *b*, thereby firmly securing one end of the band to one end of the buckle. The opposite end of the buckle is provided with a slot or band-opening, C, the plane of which band-opening is slightly below the plane of the body of the buckle and at a slight angle with the plane of the body of the buckle, as shown in the accompanying drawings, the object and purpose of which being to furnish a band-opening through which the free end of the band may be readily inserted when the buckle is turned back upon the band end to which the buckle is first secured.

In the accompanying drawings I have represented the form of construction for accomplishing this object.

In the example shown a loop, *c*, is formed on the under side of the buckle, so that, when the buckle is turned back upon the band an opening will be presented, through which the free end of the band may be inserted without disturbing the position of the buckle.

To more clearly explain and set forth the nature, purpose, and operation of my improved buckle, reference is made to Fig. 2 of the drawings.

The band (designated by the letter D) has the buckle secured to one end thereof preparatory to imparting strain on the free end B′ of the band. The buckle is now turned upward and backward against the band end B, to which it is secured, as represented on the band E, and the free end B′ is inserted through the band-opening C, and drawn upward until all the slack is taken from the band, as illustrated on band F. After the required strain has been exerted on the free end of the band, its extreme end, or that portion thereof which projects through the band-opening in the buckle, is bent forward or backward in any desired manner a sufficient distance to insure a slight bend in the band, in order that when pressure is relieved from the bale the free end of the band will automatically turn the buckle into its locked position, as represented on the several bands designated by the letter G.

Upon reference to Fig. 1 of the drawings, it will be observed that the upper portion, H, of the free end of the buckle operates to force the end of the band downward, forming an outward return-bend, I, therein, which effectually prevents the displacement of the band from the buckle.

I do not limit myself to any particular material from which to construct my improved buckle, and would have it understood that my improvement includes within its scope any buckle adapted to be secured at one end to a band, so constructed that when the buckle is turned back upon the band end to which it is secured a band-opening will be presented, through which the free end of the band may be inserted without disturbing the position of the buckle.

Buckles embodying my invention are of great value and importance when automatically-locking buckles are desired, for the reason that the free end of the band may be readily inserted in the band-opening in the buckle, and then by releasing the pressure upon the bale the expansive energy or force of the cotton being transferred to the band tends to expand the same—that is to say, forces the opposite ends of the band apart, and thus upsets the buckle and effects the locking of the tie.

Having fully described my invention, what I claim as new, and desire to secure by Letters Patent, is—

1. A buckle for cotton-bale ties, consisting, essentially, in a buckle provided with a band-opening for the attachment of one end of the band, and with a band-opening through which the free end of the band may be inserted when the buckle is turned back upon the band end to which it is secured, substantially as set forth.

2. A buckle provided with a cross-bar at one end for the attachment of one end of the band, and the opposite end of the buckle provided with a slot or band-opening the plane of which is slightly below the plane of the body of the buckle and at a slight angle with the plane of the body of the buckle, in the manner and for the purpose set forth.

3. A buckle provided with a band-opening at one end for the attachment of one end of a band, and with a band-opening at its opposite end through which the free end of the band may be inserted when the buckle is turned back upon the band end to which it is secured, whereby the extreme end of the band will project outwardly when the buckle is turned over into its locked position and the ends of the band secured in place, substantially as set forth.

4. A buckle provided with a cross-bar at one end for the attachment of one end of the band, while the other end of the buckle is provided with two cross-bars located in different vertical planes, said cross-bars being constructed and arranged in such a manner that when the buckle is upset or turned over the free end of the band is held by the lower cross-bar, while the upper cross-bar serves to hold the extreme end of the band in place, substantially as set forth.

In testimony that I claim the foregoing I have hereunto set my hand this 4th day of March, A. D. 1879.

JOHN L. SHEPPARD.

Witnesses:
WILMOT D. PORCHER,
JULIUS A. BLAKE.